H. W. ENGEL.
SCALE FOR DRAWING UTENSILS.
APPLICATION FILED NOV. 4, 1911.
1,061,994.
Patented May 20, 1913.
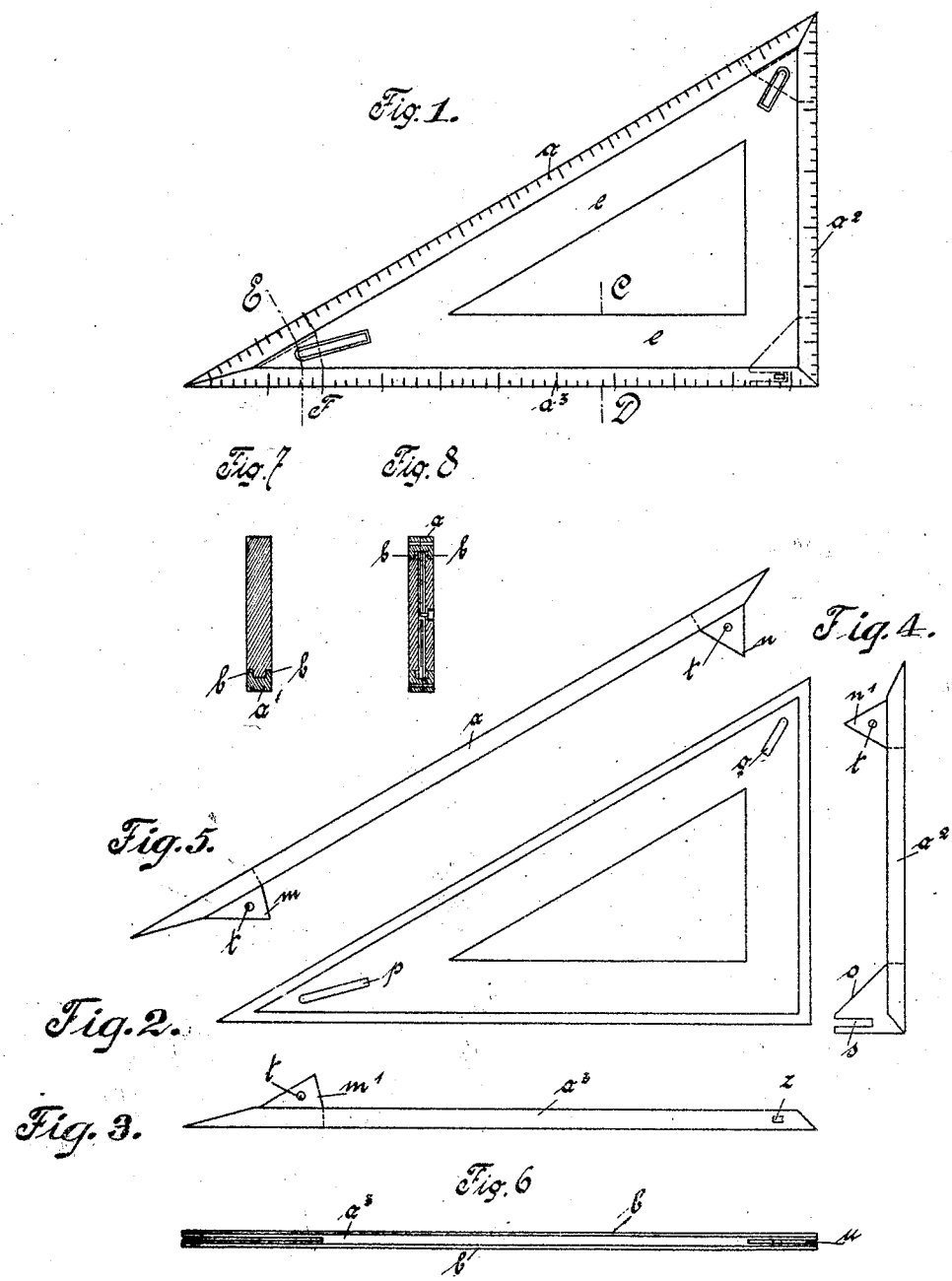

UNITED STATES PATENT OFFICE.

HERMANN WILHELM ENGEL, OF HAMBURG, GERMANY.

SCALE FOR DRAWING UTENSILS.

1,061,994. Specification of Letters Patent. Patented May 20, 1913.

Application filed November 4, 1911. Serial No. 658,456.

*To all whom it may concern:*

Be it known that I, HERMANN WILHELM ENGEL, a subject of the German Emperor, residing at Hamburg, Germany, have invented a new and Improved Scale for Drawing Utensils, of which the following is a specification.

This invention relates to a scale which is adapted to be removably secured to the edge of a T-square, set square, triangle or similar drawing utensil. By the use of this scale the drawings can be executed on either an enlarged or reduced scale without the assistance of a separate scale, so that the work of the draftsman is greatly facilitated.

In the accompanying drawings: Figure 1 is a side view of a scale embodying my invention showing it applied to a triangle; Fig. 2 a side view of the triangle with the scale detached; Fig. 3 is a side view of one of the scale members; Fig. 4 a similar view of a second scale member; Fig. 5 a similar view of a third scale member; Fig. 6 an end view of the scale member shown in Fig. 3; Fig. 7 an enlarged cross section on line C—D, Fig. 1, and Fig. 8 a similar section on line E—F, Fig. 1.

The scale is made substantially U-shaped in cross section and is adapted to straddle the edges of a T-square, triangle or similar drawing utensil $e$. The scale is composed of as many separable members $a^1$, $a^2$, $a^3$ as there are working edges on said utensil, so that it may be readily applied and removed. The drawing shows the invention applied to a triangle, the edges of which are recessed along both faces to form tongues adapted to enter the U-shaped scales $a^1$, $a^2$, $a^3$, so that in this way the shanks $b$ of the latter will be flush with the faces of the utensil. At one of the acute angles of the triangle $e$, scales $a^1$, $a^3$ are provided with inwardly extending overlapping lugs $m$, $m^1$ adapted to enter a slot or recess here formed in the corner of the triangle. In like manner scales $a^1$, $a^2$ are provided at the other acute angle with the overlapping lugs $n$, $n^1$ adapted to enter a corresponding corner recess. Lugs $m$, $m^1$ and $n$, $n^1$ are apertured as at $t$ to receive locking pins carried by springs $p$, $q$ which are secured to one of the faces of the triangle. At the right angle, scale $a^2$ is provided with a lug $o$ having slot $s$, while scale $a^3$ as well as the corner of the triangle is slitted for the accommodation of such lug. Across the slot $u$ of scale $a^3$ extends a pin $z$ adapted to engage slot $s$ when the parts are assembled.

It will be seen that by the construction described, the triangle is reinforced at the corners, so that its most vulnerable parts are effectively protected. In dismembering the device, springs $p$, $q$ are raised to lift their pins out of apertures $t$, scale $a^1$ is removed and then scales $a^2$, $a^3$ are successively withdrawn in any order desired. To assemble the parts, the above manipulation is reversed as will be readily understood.

I claim:

1. A drawing utensil provided with a recess at one of its corners combined with a scale of U-shaped cross section adapted to straddle said utensil and having a lug adapted to enter said recess.

2. A drawing utensil provided with a tongued edge and a recessed corner combined with a scale of U-shaped cross section adapted to straddle said edge and having a lug adapted to enter said corner.

3. A drawing utensil provided with corner recesses and springs having locking pins combined with scales of U-shaped cross section adapted to straddle said utensil and having apertured lugs adapted to enter the recesses and to be engaged by the pins.

4. A drawing utensil having recessed corners combined with a plurality of scales of U-shaped cross section having lugs adapted to enter said corners, one of said lugs having a slot while the adjoining end of the abutting scale is provided with a pin adapted to enter said slot.

Signed by me at Hamburg, Germany, this 25th day of October, 1911.

HERMANN WILHELM ENGEL.

Witnesses:
AUGUST A. WENK,
ERNEST H. L. MUMMENHOFF.